(12) United States Patent
Yamamoto

(10) Patent No.: US 10,930,979 B2
(45) Date of Patent: Feb. 23, 2021

(54) ENERGY STORAGE DEVICE AND METHOD OF MANUFACTURING ENERGY STORAGE DEVICE

(71) Applicant: Blue Energy Co., Ltd., Kyoto (JP)

(72) Inventor: Yuta Yamamoto, Kyoto (JP)

(73) Assignee: BLUE ENERGY CO., LTD., Kyoto (JP)

( * ) Notice: Subject to any disclaimer, the term of this patent is extended or adjusted under 35 U.S.C. 154(b) by 63 days.

(21) Appl. No.: 16/157,258

(22) Filed: Oct. 11, 2018

(65) Prior Publication Data

US 2019/0109348 A1 Apr. 11, 2019

(30) Foreign Application Priority Data

Oct. 11, 2017 (JP) .............................. JP2017-197920

(51) Int. Cl.
| | | |
|---|---|---|
| *H01M 10/0585* | (2010.01) | |
| *H01M 10/0525* | (2010.01) | |
| *H01M 2/26* | (2006.01) | |
| *H01G 11/10* | (2013.01) | |
| *H01G 11/66* | (2013.01) | |
| *H01G 11/78* | (2013.01) | |
| *H01G 11/74* | (2013.01) | |

(Continued)

(52) U.S. Cl.
CPC ........ *H01M 10/0585* (2013.01); *H01G 11/10* (2013.01); *H01G 11/66* (2013.01); *H01G 11/74* (2013.01); *H01G 11/78* (2013.01); *H01G 11/84* (2013.01); *H01M 2/266* (2013.01); *H01M 10/0525* (2013.01); *H01G 11/86* (2013.01)

(58) Field of Classification Search
CPC ......... H01M 10/0525; H01M 10/0585; H01M 2/26; H01M 2/266
See application file for complete search history.

(56) References Cited

U.S. PATENT DOCUMENTS

| | | |
|---|---|---|
| 2008/0078815 A1 | 4/2008 | Taniguchi et al. |
| 2009/0117456 A1 | 5/2009 | Hosaka et al. |

(Continued)

FOREIGN PATENT DOCUMENTS

| | | |
|---|---|---|
| JP | 2008-084755 A | 4/2008 |
| JP | 2009-135079 A | 6/2009 |

(Continued)

*Primary Examiner* — Karie O'Neill Apicella
(74) *Attorney, Agent, or Firm* — McGinn I.P. Law Group, PLLC.

(57) ABSTRACT

An energy storage device includes: an electrode assembly, wherein electrodes each including a covered portion which is covered by an active material layer and a non-covered portion which extends from the covered portion and is not covered by the active material layer are stacked on each other such that the covered portions overlap with each other and the non-covered portions overlap with each other, and the electrode assembly having a non-covered stacked portion where the non-covered portions are stacked on each other; a protective plate being brought into face contact with the non-covered stacked portion from one side in a stacking direction of the non-covered stacked portion; a current collector including a bonding portion which is brought into face contact with the non-covered stacked portion from an other side in the stacking direction, and an enlarged width portion extending from the bonding portion.

18 Claims, 11 Drawing Sheets

(51) Int. Cl.
   *H01G 11/84* (2013.01)
   *H01G 11/86* (2013.01)

(56) References Cited

U.S. PATENT DOCUMENTS

| 2011/0052976 | A1* | 3/2011 | Ishii | H01M 2/22 |
| | | | | 429/178 |
| 2017/0214030 | A1* | 7/2017 | Tsutsumi | H01M 2/06 |

FOREIGN PATENT DOCUMENTS

| JP | 2013-004222 A | 1/2013 |
| JP | 2015-069767 A | 4/2015 |
| JP | 2015-099739 A | 5/2015 |

\* cited by examiner

ENERGY STORAGE DEVICE AND METHOD OF MANUFACTURING ENERGY STORAGE DEVICE

CROSS-REFERENCE TO RELATED APPLICATIONS

This application claims the benefit of Japanese patent application No. 2017-197920 filed on Oct. 11, 2017, which is incorporated by reference.

FIELD

The present invention relates to an energy storage device and a method of manufacturing the energy storage device.

BACKGROUND

Conventionally, there has been known a method of manufacturing a lithium ion battery where a current collector connection plate is bonded to a group of electrodes by ultrasonic bonding (see JP 2013-4222 A).

In this manufacturing method, firstly a sheet-like positive electrode plate having a positive electrode metal foil and a sheet-like negative electrode plate having a negative electrode metal foil are wound in a flat shape in a state where these plates are stacked on each other thus forming a group of electrodes. In such a group of electrodes, a current collector foil stacked portion is formed on both end portions of the group of electrodes in a width direction.

As shown in FIG. 12, the current collector foil stacked portion 102 of the group of electrodes is brought into contact with the current collector connection plate 101 and, further, a protective metal plate 103 is brought into contact with the current collector foil stacked portion 102. Then, the current collector connection plate 101, the current collector foil stacked portion 102 and the protective metal plate 103 are sandwiched between a working surface of an anvil 104 and an ultrasonic horn 105 of an ultrasonic welder, and these parts are bonded to each other by ultrasonic bonding.

The group of electrodes to which the current collector connection plate 101 is connected in this manner is inserted into a battery case thus completing a lithium ion battery.

In such a manufacturing method, until the current collector connection plate 101, the current collector foil stacked portion 102 and the protective metal plate 103 are sandwiched between the working surface of the anvil 104 and the ultrasonic horn 105 of the ultrasonic welder, the current collector connection plate 101, the current collector foil stacked portion 102 and the protective metal plate 103 are disposed in a state where these parts are simply made to overlap with each other and hence, the protective metal plate 103 or the like is liable to be easily displaced. When bonding is performed in a state where the protective metal plate 103 projects toward the outside (a right side in FIG. 12) from the current collector connection plate 101 and the group of electrodes, along with the insertion of the group of electrodes into a battery case, the protective metal plate 103 may be brought into contact with the battery case or the protective metal plate 103 may be brought into contact with an insulating member disposed between the group of electrodes and the battery case thus causing a damage on the insulating member. When bonding is performed in a state where the protective metal plate 103 is displaced, the increase of resistance (lowering of performance) due to defective bonding may occur.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage device where a protective plate is minimally displaced to the outside from a current collector at the time of bonding, and a method of manufacturing such an energy storage device.

An energy storage device according to an aspect of the present invention includes: an electrode assembly including a non-covered stacked portion, wherein electrodes each including a covered portion which is covered by an active material layer and a non-covered portion which extends from the covered portion in a first direction and is not covered by the active material layer are stacked on each other such that the covered portions overlap with each other and the non-covered portions overlap with each other, and the non-covered stacked portion is formed by stacking the non-covered portions; a protective plate which is brought into face contact with the non-covered stacked portion from one side in a stacking direction orthogonal to the first direction of the non-covered stacked portion; a current collector having a bonding portion which is brought into face contact with the non-covered stacked portion from the other side in the stacking direction, and an enlarged width portion extending in the stacking direction from the bonding portion in a region disposed adjacently to a distal end of the non-covered stacked portion in the first direction; and a case housing the electrode assembly, the protective plate and the current collector. The enlarged width portion is configured to restrict movement of the protective plate in the first direction.

A method of manufacturing an energy storage device according to another aspect of the present invention includes: providing an electrode assembly, wherein electrodes each including a covered portion which is covered by an active material layer and a non-covered portion which extends from the covered portion in a first direction and is not covered by the active material layer are stacked on each other such that the covered portions overlap with each other and the non-covered portions overlap with each other; bringing a bonding portion which a current collector includes into face contact with a non-covered stacked portion formed by stacking the non-covered portions from one side in a stacking direction orthogonal to the first direction of the non-covered portion, and bringing a protective plate into face contact with the non-covered stacked portion from the other side in the stacking direction; and bonding the bonding portion, the non-covered stacked portion and the protective plate to each other in a state where the non-covered stacked portion is sandwiched between the bonding portion and the protective plate. The current collector includes an enlarged width portion which projects from the non-covered stacked portion from the one side toward the other side of the non-covered stacked portion in a region disposed adjacently to a distal end of the non-covered stacked portion in the first direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
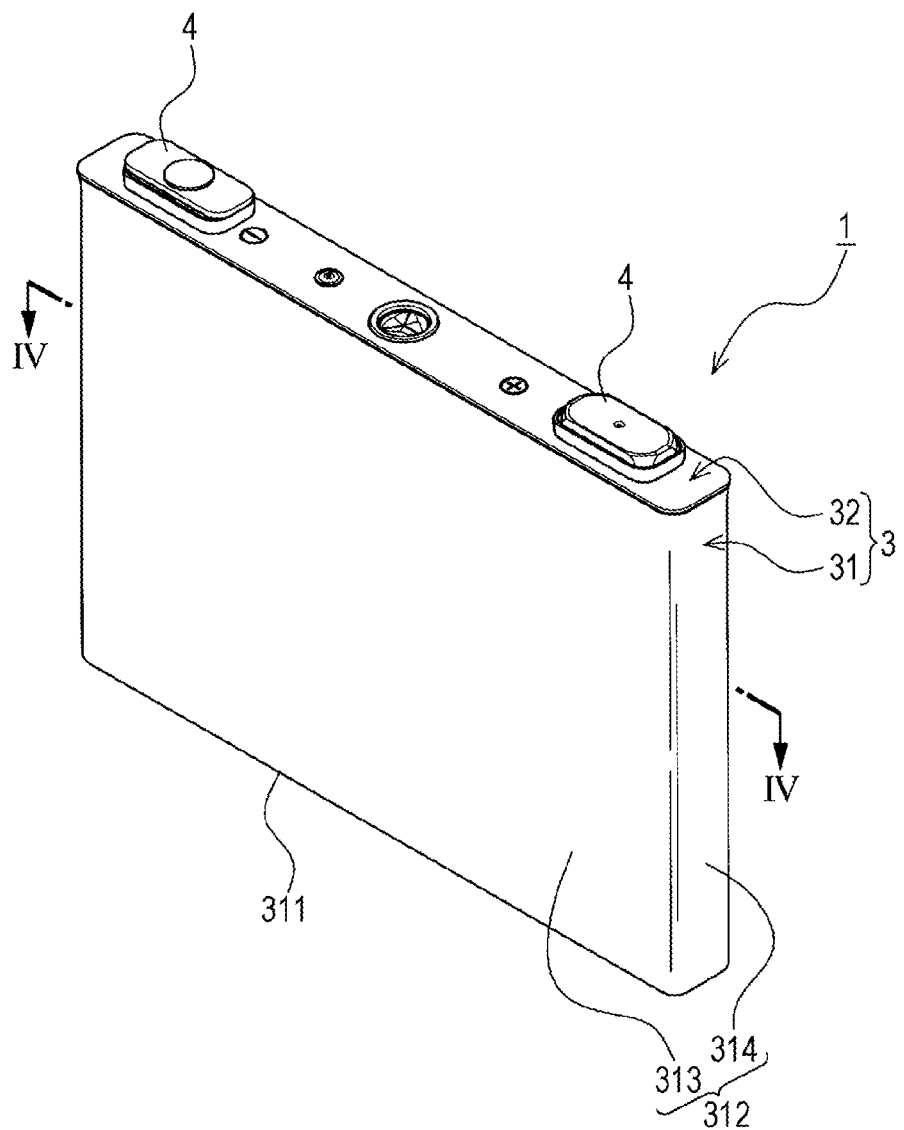
FIG. 1 is a perspective view of an energy storage device according to an embodiment of the present invention.
Figure 2:
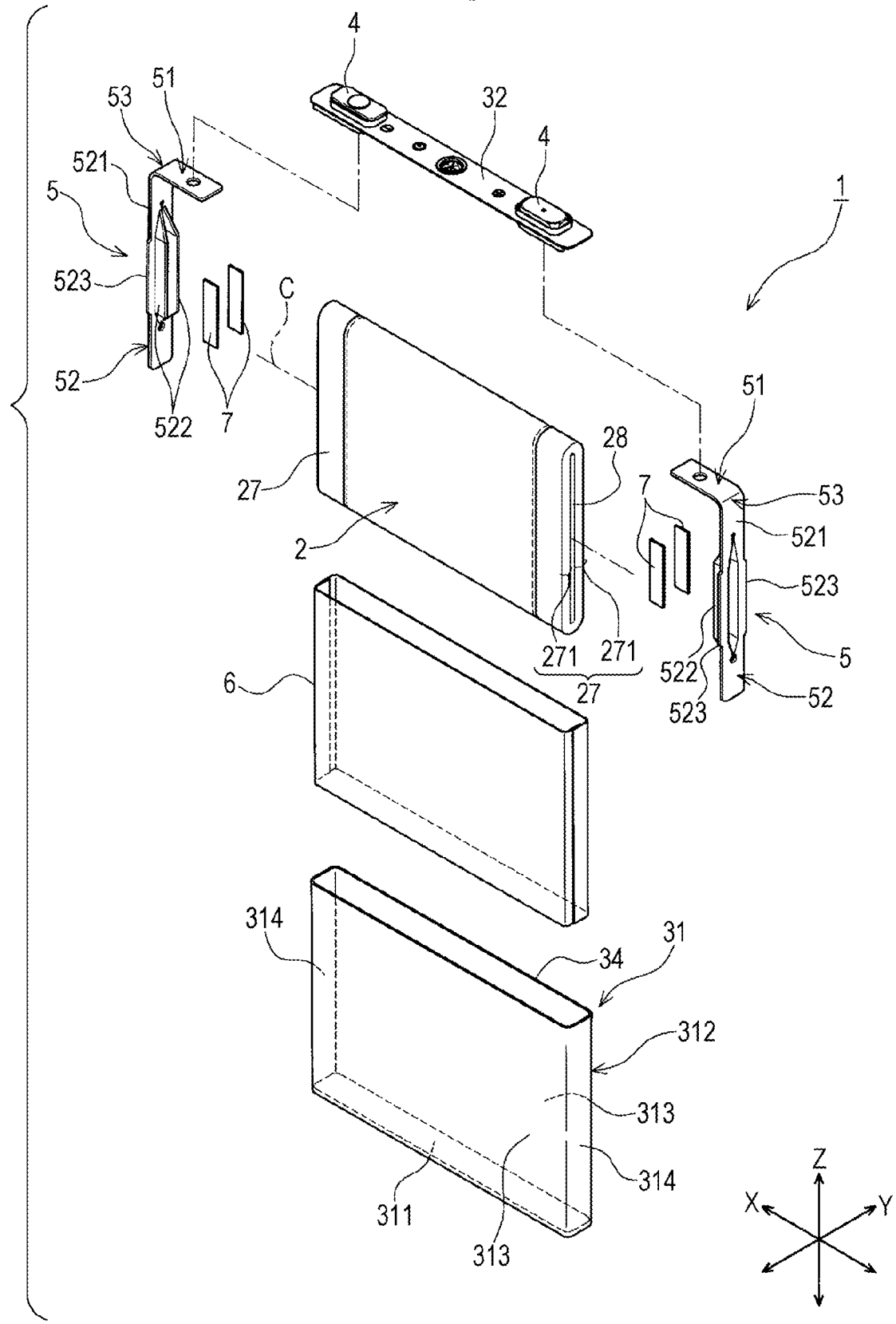
FIG. 2 is an exploded perspective view of the energy storage device.
Figure 3:
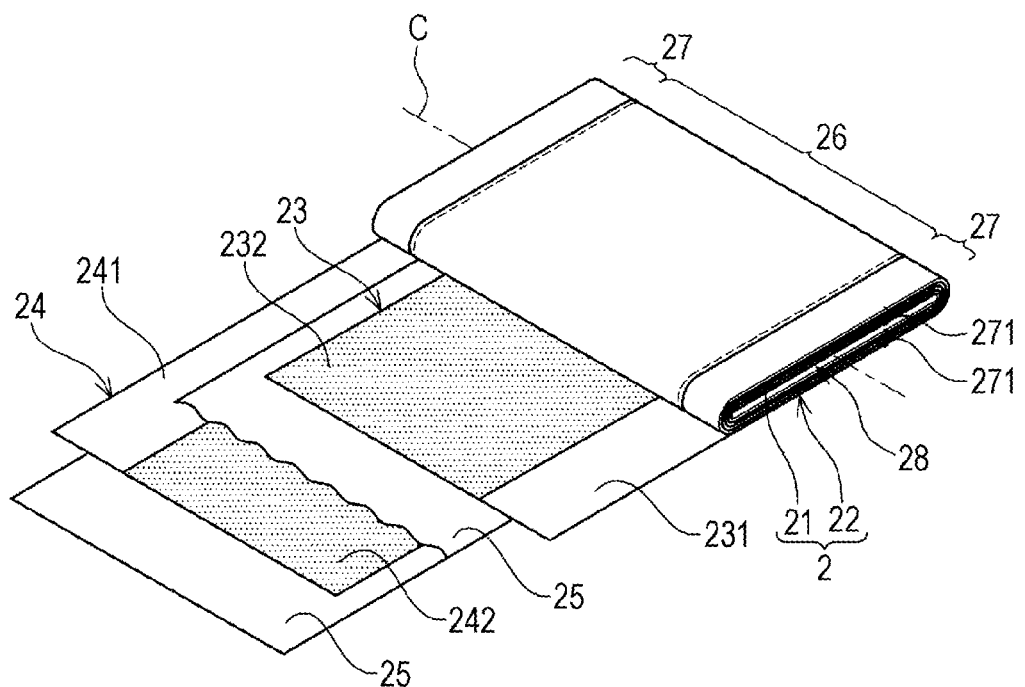
FIG. 3 is a view for describing an electrode assembly of the energy storage device
Figure 3:
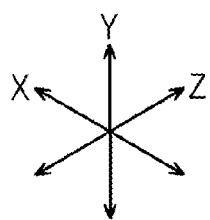

An energy storage device according to an aspect of the present invention includes: an electrode assembly including a non-covered stacked portion, wherein electrodes each including a covered portion which is covered by an active material layer and a non-covered portion which extends from the covered portion in a first direction and is not covered by the active material layer are stacked on each other such that the covered portions overlap with each other and the non-covered portions overlap with each other, and the non-covered stacked portion is formed by stacking the non-covered portions; a protective plate which is brought into face contact with the non-covered stacked portion from one side in a stacking direction orthogonal to the first direction of the non-covered stacked portion; a current collector having a bonding portion which is brought into face contact with the non-covered stacked portion from the other side in the stacking direction, and an enlarged width portion extending in the stacking direction from the bonding portion in a region disposed adjacently to a distal end of the non-covered stacked portion in the first direction; and a case housing the electrode assembly, the protective plate and the current collector. The enlarged width portion is configured to restrict movement of the protective plate in the first direction.

With such a configuration, at the time of manufacturing the energy storage device, even when the protective plate intends to move toward the distal end of the non-covered stacked portion when the bonding portion, the non-covered stacked portion and the protective plate are made to overlap with each other, the protective plate is brought into contact with the enlarged width portion (restricting portion) so that the movement of the protective plate is restricted. Therefore, the displacement of the protective plate toward the outside from the current collector at the time of bonding can be suppressed. According to the energy storage device having the above-mentioned configuration, a cross-sectional area of the current collector is increased at the enlarged width portion and hence, resistance in the current collector can be suppressed.

The current collector may be directly fixed to the case.

The case may include a case body having an inner surface which opposedly faces the protective plate, and the inner surface of the case body, the protective plate and the non-covered stacked portion may be disposed in this order in the stacking direction.

A method of manufacturing an energy storage device according to another aspect of the present invention includes: providing an electrode assembly, wherein electrodes each including a covered portion which is covered by an active material layer and a non-covered portion which extends from the covered portion in a first direction and is not covered by the active material layer are stacked on each other such that the covered portions overlap with each other and the non-covered portions overlap with each other; bringing a bonding portion which a current collector includes into face contact with a non-covered stacked portion formed by stacking the non-covered portions from one side in a stacking direction orthogonal to the first direction of the non-covered portion, and bringing a protective plate into face contact with the non-covered stacked portion from the other side in the stacking direction; and bonding the bonding portion, the non-covered stacked portion and the protective plate to each other in a state where the non-covered stacked portion is sandwiched between the bonding portion and the protective plate. The current collector includes an enlarged width portion which projects from the non-covered stacked portion from the one side toward the other side of the non-covered stacked portion in a region disposed adjacently to a distal end of the non-covered stacked portion in the first direction.

With such a configuration, even when the protective plate intends to move toward the distal end of the non-covered stacked portion when the bonding portion, the non-covered stacked portion and the protective plate are made to overlap with each other, the protective plate is brought into contact with the enlarged width portion (restricting portion) and hence, movement of the protective plate is restricted. Accordingly, it is possible to prevent the displacement of the protective plate toward the outside from the current collector at the time of bonding.

According to the aspect of the present invention, it is possible to provide the energy storage device where the protective plate is minimally displaced toward the outside from the current collector at the time of bonding, and the method of manufacturing the energy storage device.

Hereinafter, one embodiment of a method of manufacturing an energy storage device according to the present invention is described with reference to FIG. 1 to FIG. 10. As the energy storage device manufactured by the manufacturing method according to this embodiment, a primary battery, a secondary battery, a capacitor and the like can be named. In this embodiment, the description is made with respect to the chargeable and dischargeable secondary battery as one example of the energy storage device. Hereinafter, firstly, the configuration of the energy storage device manufactured by the manufacturing method according to this embodiment is described and, thereafter, the method of manufacturing the energy storage device is described. Names of respective constitutional members (respective constitutional elements) of this embodiment are used only for this embodiment, and may differ from names of respective constitutional members (respective constitutional elements) used in BACKGROUND.

The energy storage device manufactured by the manufacturing method of this embodiment is a nonaqueous electrolyte secondary battery. To be more specific, the energy storage device is a lithium ion secondary battery which utilizes the movement of electrons generated by the movement of lithium ions. Such a kind of energy storage device supplies electric energy. The energy storage device is used in a single form or in a plural form. When a required output and a required voltage are small, the energy storage device is used in a single form. When at least either one of a required output or a required voltage is large, the energy storage device is used in combination with other energy storage device in an energy storage apparatus. In the above-mentioned energy storage apparatus, the energy storage devices used in the energy storage apparatus supply electric energy.

As shown in FIG. 1 to FIG. 4, the energy storage device includes: an electrode assembly 2; a case 3 which houses the electrode assembly 2 therein; external terminals 4 where at least a part of each external terminal 4 is exposed to the outside of the case 3; and current collectors 5 which make the electrode assembly 2 and the external terminals 4 conductive with each other. The energy storage device 1 also includes an insulating member 6 disposed between the electrode assembly 2 and the case and the like 3. In this embodiment, the energy storage device 1 includes protective plates 7 which protect the electrode assembly 2 at the time of bonding the electrode assembly 2 and the current collectors 5 to each other.

The electrode assembly 2 includes electrodes (a positive electrode 23 and a negative electrode 24) which are wound together in a stacked manner. The electrode assembly 2 includes: a winding core 21; and a layered product 22 where the positive electrode 23 and the negative electrode 24 are stacked on each other in an insulated manner and the layered product 22 is wound around the winding core 21 (see FIG. 3 and FIG. 4). Since lithium ions move between the positive electrode 23 and the negative electrode 24 in the electrode assembly 2, the energy storage device 1 can charge electricity and can discharge electricity.

Generally, the winding core 21 is made of an insulating material. In this embodiment, the winding core 21 has a cylindrical shape. The winding core 21 has a flat cylindrical shape. The winding core 21 is formed by winding a sheet having flexibility or thermoplasticity. In this embodiment, the sheet is formed using a synthetic resin.

The positive electrode 23 has a covered portion 232 which is covered by an active material layer, and a non-covered portion 231 which extends from the covered portion 232 and is not covered by the active material layer. The positive electrode 23 has a strip-shaped metal foil, and a positive active material layer which is overlapped to the metal foil. In this positive electrode 23, the non-covered portion 231 where the metal foil is not covered by the positive active material layer (a portion where the positive active material layer is not formed) is formed on one edge portion of the positive electrode 23 in a width direction which is a lateral direction of the positive electrode 23, and the covered portion 232 where the metal foil is covered by the positive active material layer is formed on a remaining portion of the positive electrode 23 in the width direction. A metal foil which is used for forming the positive electrode 23 of this embodiment is an aluminum foil, for example.

In the same manner as the positive electrode 23, the negative electrode 24 also has a covered portion 242 which is covered by an active material layer, and a non-covered portion 241 which extends from the covered portion 242 and is not covered by the active material layer. The negative electrode 24 has a strip-shaped metal foil, and a negative active material layer which is overlapped to the metal foil. In the negative electrode 24, the non-covered portion 241 where the metal foil is not covered by the negative active material layer (a portion where the negative active material layer is not formed) is formed on an edge portion of the negative electrode 24 on the other side in the width direction (on a side opposite to the non-covered portion 231 of the positive electrode 23) which is a lateral direction of the negative electrode 24, and the covered portion 242 where the metal foil is covered by the negative active material layer is formed on a remaining portion of the negative electrode 24 in the width direction. The metal foil which is used for forming the negative electrode 24 of this embodiment is a copper foil, for example.

In the electrode assembly 2 of this embodiment, the positive electrode 23 and the negative electrode 24 having the above-mentioned configurations are wound together in a state where the positive electrode 23 and the negative electrode 24 are insulated from each other by a separator 25. In this manner, in the electrode assembly 2 where the positive electrode 23 and the negative electrode 24 are wound together, the covered portions 232 of the positive electrode 23 are stacked on each other, and the non-covered portions 231 of the positive electrode are stacked on each other. The covered portions 242 of the negative electrode 24 are stacked on each other, and the non-covered portions 241 of the negative electrode 24 are stacked on each other. In the electrode assembly 2, the covered portions 232 of the positive electrode 23 and the covered portions 242 of the negative electrode 24 are alternately stacked on each other with the separator 25 interposed therebetween.

The separator 25 is made of a material having insulation property, and is disposed between the positive electrode 23 and the negative electrode 24. With such a configuration, in the electrode assembly 2 (to be more specific, the layered product 22), the positive electrode 23 and the negative electrode 24 are insulated from each other. The separator 25 keeps an electrolyte solution in the inside of the case 3. With such a configuration, at the time of charging or discharging the energy storage device 1, lithium ions can move between the positive electrode 23 and the negative electrode 24 which are alternately stacked on each other with the separator 25 sandwiched between the positive electrode 23 and the negative electrode 24.

The separator 25 has a strip shape and is formed of, for example, a porous membrane made of polyethylene, polypropylene, cellulose, polyamide or the like. In this embodiment, the separator 25 is formed by forming an inorganic layer containing inorganic particles such as $SiO_2$ particles, $Al_2O_3$ particles, boehmite (alumina hydrate) on a substrate formed of a porous membrane. In this embodiment, the substrate of the separator 25 is made of polyethylene, for example.

A size of the separator 25 in the width direction is larger than a width of the negative active material layer. The separator 25 is disposed between the positive electrode 23 and the negative electrode 24 which overlap with each other in a displaced manner in the width direction such that the covered portions 232 of the positive electrode 23 and the covered portions 242 of the negative electrode 24 overlap with each other in a thickness direction (in a stacking direction). In this state, the non-covered portions 231 of the positive electrode 23 protrude in the width direction (in a direction orthogonal to the stacking direction) from a region where the positive electrode 23 and the negative electrode 24 overlap with each other, and the non-covered portions 241 of the negative electrode 24 protrude in a width direction (in a direction opposite to a protruding direction of the non-covered portions 231 of the positive electrode 23) from the region where the positive electrode 23 and the negative electrode 24 overlap with each other. The electrode assembly 2 is formed by winding the positive electrode 23, the negative electrode 24, and the separator 25 which are stacked on each other as described above.

In the electrode assembly 2 of this embodiment, the covered stacked portion 26 of the electrode assembly 2 is formed of a portion where the covered portions 232 of the positive electrode 23 and the covered portions 242 of the negative electrode 24 are stacked on each other with the separator 25 interposed therebetween. In this electrode assembly 2, a non-covered stacked portion 27 of the electrode assembly 2 is formed of a portion where only the non-covered portions 231 of the positive electrode 23 or only the non-covered portions 241 of the negative electrode 24 are stacked.

In the electrode assembly 2, the non-covered stacked portion 27 is a portion conductive with the current collector 5. In this embodiment, the non-covered stacked portion 27 is divided into two portions (divided non-covered stacked portions) 271 in a state where a hollow portion 28 (see FIG. 3) is sandwiched between two portions 271 as viewed in a direction of a winding center axis C of the positive electrode 23, the negative electrode 24, and the separator 25 which are wound together.

The non-covered stacked portion 27 having the above-mentioned configuration is mounted on respective electrodes of the electrode assembly 2. That is, a portion where only the non-covered portions 231 of the positive electrode 23 are stacked forms the non-covered stacked portion 27 of the positive electrode of the electrode assembly 2. A portion where only the non-covered portions 241 of the negative electrode 24 are stacked forms the non-covered stacked portion 27 of the negative electrode of the electrode assembly 2.

The case 3 includes: a case body 31 which has an opening; and a lid plate 32 which closes the opening of the case body 31. An electrolyte solution is housed in an inner space of the case 3 together with the electrode assembly 2, the current collectors 5 and the like. The case 3 is formed using metal having resistance to the electrolyte solution. In this embodiment, the case 3 is formed using an aluminum-based metal material such as aluminum or an aluminum alloy, for example.

The case 3 is formed by bonding an opening peripheral edge portion 34 of the case body 31 and a peripheral edge portion of the lid plate 32 to each other in a state where the opening peripheral edge portion 34 of the case body 31 and the peripheral edge portion of the lid plate 32 overlap with each other. In the case 3, the internal space is defined by the case body 31 and the lid plate 32.

The case body 31 includes: a plate-like closing portion 311; and a cylindrical barrel portion (peripheral wall) 312 which is connected to a peripheral edge of the closing portion 311.

In a stacking direction, an inner surface of the case body 31 (peripheral wall), the protective plate 7, and the non-covered stacked portion 27 are disposed in this order.

The closing portion 311 is a portion which is positioned at a lower end of the case body 31 when the case body 31 is disposed in a posture that the opening of the case body 31 is directed upward (that is, the closing portion 311 forming a bottom wall of the case body 31 when the opening is directed upward). The closing portion 311 has a rectangular shape as viewed from a normal direction of the closing portion 311.

Hereinafter, a long-side direction of the closing portion 311 is assumed as an X axis in an orthogonal coordinate system, a short-side direction of the closing portion 311 is assumed as a Y axis in the orthogonal coordinate system, and a normal direction of the closing portion 311 is assumed as a Z axis in the orthogonal coordinate system.

The barrel portion 312 has an angular cylindrical shape. To be more specific, the barrel portion 312 has a flat rectangular cylindrical shape. The barrel portion 312 has a pair of long wall portions 313 which extends from long sides of the peripheral edge of the closing portion 311, and a pair of short wall portions 314 which extends from short sides of the peripheral edge of the closing portion 311. The short wall portions 314 connect corresponding end portions of the pair of long wall portions 313 (to be more specific, opposedly facing each other in the Y axis direction) thus forming the barrel portion 312 having an angular cylindrical shape.

As has been described above, the case body 31 has an angular cylindrical shape having one end thereof closed in an opening direction (Z axis direction) (that is, bottomed angular cylindrical shape). In the case body 31, the electrode assembly 2 is housed in a state where the winding center axis C direction is directed in the X axis direction (see FIG. 2).

The lid plate 32 is a plate-like member which closes the opening of the case body 31. A profile of the lid plate 32 corresponds to a profile of the opening peripheral edge portion 34 of the case body 31. In this embodiment, the lid plate 32 is a rectangular plate shape elongated in the X axis direction. The lid plate 32 is brought into contact with the case body 31 so as to close the opening of the case body 31. To be more specific, the peripheral edge portion of the lid plate 32 is made to overlap with the opening peripheral edge portion 34 of the case body 31 such that the lid plate 32 closes the opening. In a state where the opening peripheral edge portion 34 and the lid plate 32 overlap with each other, a boundary portion between the lid plate 32 and the case body 31 are welded to each other. The case 3 is formed as described above.

The external terminal 4 is a portion electrically connected to an external terminal of other energy storage device, an external equipment or the like. The external terminal 4 is made of a material having conductivity. For example, the external terminal 4 is made of a metal material having high weldability such as an aluminum-based metal material including aluminum or an aluminum alloy, or a copper-based metal material including copper or a copper alloy. In this embodiment, the external terminals 4 are mounted on the lid plate 32.

The current collectors 5 are disposed in the inside of the case 3, and are directly or indirectly connected to the electrode assembly 2 in a conductive manner. In this embodiment, the current collectors 5 are disposed along an inner surface of the case 3. The current collectors 5 are made of a material having conductivity.

To be more specific, as shown in FIG. 2, FIG. 4 to FIG. 6, the current collector 5 has: a first connecting portion 51 which is connected to the external terminal 4 in a conductive manner; a second connecting portion 52 which is connected to the electrode assembly 2 in a conductive manner; and a bent portion 53 which connects the first connecting portion 51 and the second connecting portion 52 to each other. In the inside of the case 3, the bent portion 53 is disposed in the vicinity of a boundary between the lid plate 32 and the short wall portion 314, the first connecting portion 51 extends along the lid plate 32 from the bent portion 53, and the second connecting portion 52 extends along the short wall portion 314 from the bent portion 53.

The first connecting portion 51 is a plate-like portion extending from the bent portion 53 along an inner surface of the case 3 (lid plate 32) in a state where the first connecting portion 51 is insulated from the case 3 (to be more specific, the lid plate 32).

The second connecting portion 52 has bonding portions 522 which are brought into face contact with the non-covered stacked portion 27 of the electrode assembly 2. To be more specific, the second connecting portion 52 has: a body 521 which extends from the bent portion 53 along the case 3; at least one bonding portion 522 which extends from the body 521 and is bonded to the electrode assembly 2; and restricting portions 523 which extend from the body 521 and restrict the movement of the protective plates 7. In this embodiment, the second connecting portion 52 has two bonding portions 522. In this embodiment, at a position where the restricting portions 523 are disposed, a portion of the body 521 disposed outside the bonding portion 522 in the Y axis direction and the restricting portions 523 may be collectively referred to as an enlarged width portion.

The body 521 extends from the bent portion 53 to the closing portion 311 or to a position in the vicinity of the closing portion 311 along the short wall portion 314 in a state where the body 521 is insulated from the short wall portion 314.

Each of two bonding portions 522 is brought into face contact with the non-covered stacked portion 27 of the electrode assembly 2 from one side in the stacking direction (Y axis direction in FIG. 4) of the non-covered portions 231, 241. In an example of this embodiment, the bonding portions 522 are brought into face contact with the non-covered stacked portions 27 (to be more specific, the divided non-covered stacked portions 271) from a hollow portion 28 side of the electrode assembly 2, that is, from an inner peripheral surface side of the flat-cylindrical-shaped electrode assembly 2. To be more specific, each of the bonding portions 522 is a plate-like portion which extends from the body 521 toward the electrode assembly 2 (non-covered stacked portion 27) and, at the same time, extends in the same direction (Z axis direction) as the body 521. The bonding portion 522 is disposed at the approximately center of the body 521 in the Z axis direction.

To define an opening 56 formed at the center of the body 521 in the Y axis direction, two bonding portions 522 extend in the Z axis direction on both sides (both sides in the Y axis direction) of the opening 56. That is, in this embodiment, the second connecting portion 52 has: the bonding portion 522 which is bonded to one divided non-covered stacked portion 271 out of two divided non-covered stacked portions 271 of each non-covered stacked portion 27; and the bonding portion 522 which is bonded to the other divided non-covered stacked portion 271 out of the two divided non-covered stacked portions 271. In the current collector 5 of this embodiment, the opening 56 and two bonding portions 522 are formed by forming a cut extending in the Z axis direction (longitudinal direction) in a strip-shaped plate extending in the Z axis direction and by twisting both sides of the cut.

Figure 4:
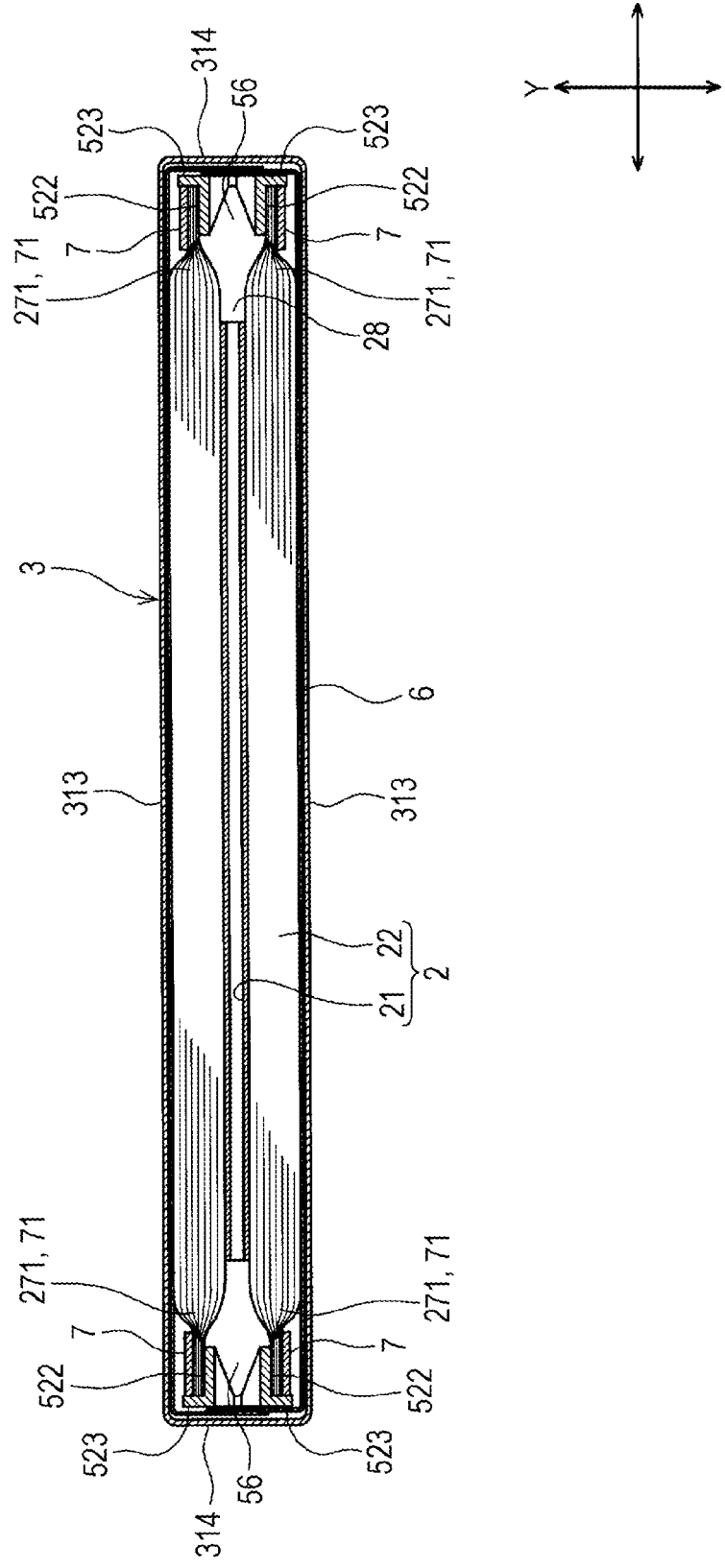
FIG. 4 is a cross-sectional view taken along line IV-IV in FIG. 1.
Figure 5:
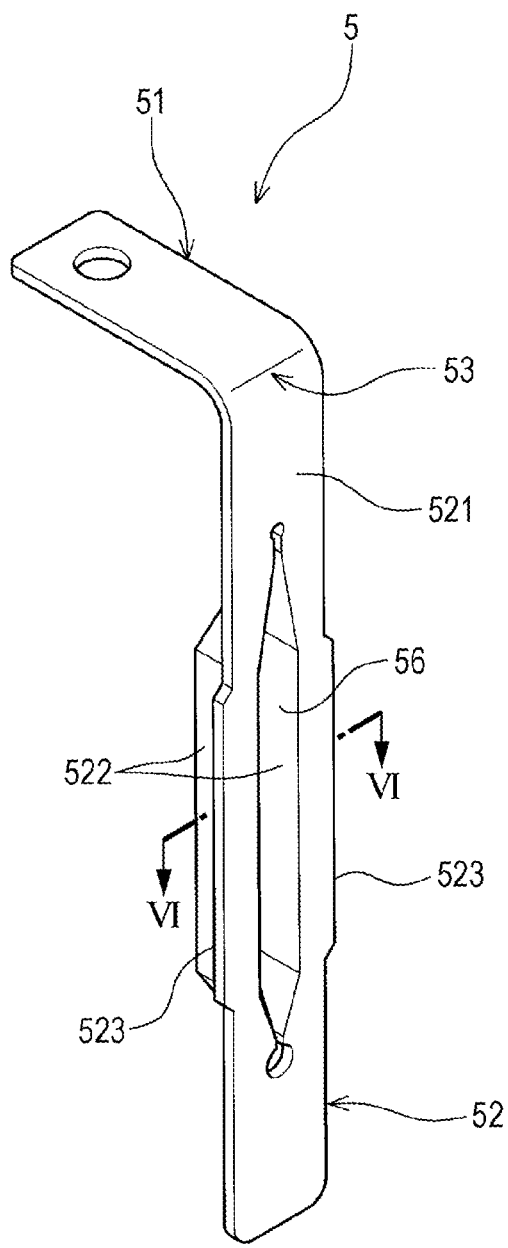
FIG. 5 is a perspective view of a current collector used in the energy storage device.
Figure 5:
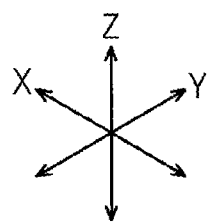
Figure 6:
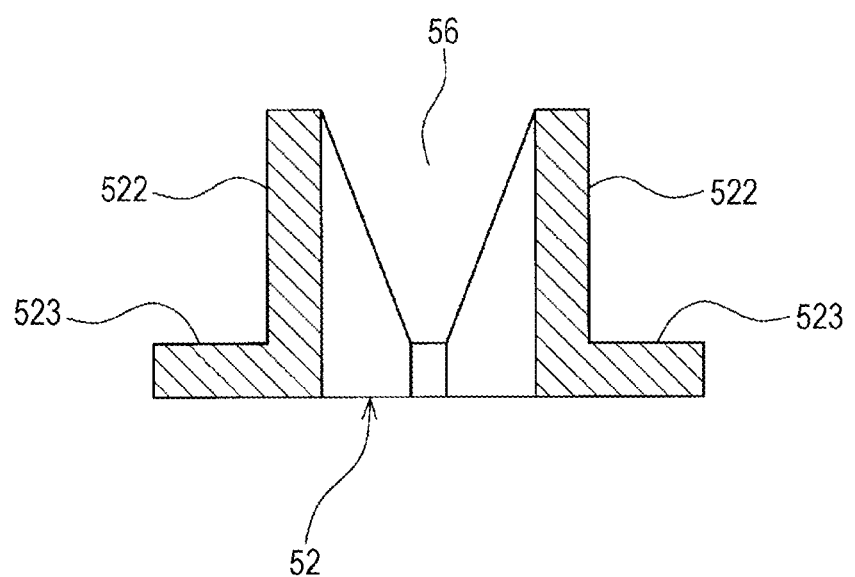
FIG. 6 is a cross-sectional view taken along line VI-VI in FIG. 5.

The restricting portion 523 projects toward a protective plate 7 side from the non-covered stacked portion 27 in a direction from one side toward the other side of the non-covered stacked portion 27 in a region (position) disposed adjacently to a distal end of the non-covered stacked portion 27 in the X axis direction (see FIG. 4). To be more specific, the restricting portion 523 extends outward in the Y axis direction from a boundary position between the restricting portion 523 and the bonding portion 522 in the body 521 and, at the same time, extends in the Z axis direction. In this embodiment, the second connecting portion 52 has two restricting portions 523. In this embodiment, the restricting portion 523 extends to a position where an end (distal end) of the restricting portion 523 in the Y axis direction projects from the protective plate 7 in a state where the electrode assembly 2 and the current collector 5 are bonded to each other (see FIG. 4). A size of the restricting portion 523 in the Z axis direction is larger than a size of the protective plate 7 in the Z axis direction.

The current collector 5 having the above-mentioned configuration is disposed on the positive electrode and the negative electrode of the energy storage device 1 respectively. In the energy storage device 1 of this embodiment, in the inside of the case 3, the current collector 5 is disposed on the non-covered stacked portion 27 forming the positive electrode of the electrode assembly 2 and on the non-covered stacked portion 27 forming the negative electrode of the electrode assembly 2 respectively. The current collector 5 of the positive electrode and the current collector 5 of the negative electrode are formed using different raw materials. To be more specific, the current collector 5 of the positive electrode is formed using aluminum or an aluminum alloy, for example. The current collector 5 of the negative electrode is formed using copper or a copper alloy, for example.

The current collectors 5 are directly fixed to the case 3 (lid plate 32).

The protective plates 7 are members for protecting the electrode assembly (specifically, the non-covered portion 231, 241 which forms the non-covered stacked portion 27) at the time of connecting the current collector 5 to the electrode assembly 2. The protective plates 7 are formed of a plate-like member respectively, and are brought into face contact with the non-covered stacked portion 27 of the electrode assembly 2 from the other side (a side opposite to a side where the bonding portion 522 is disposed) in the stacking direction. In the example of this embodiment, the protective plates 7 are brought into face contact with the non-covered stacked portion 27 (to describe in more detail, the divided non-covered stacked portion 271) from outside of the electrode assembly 2, that is, from an outer peripheral surface side of the flat-cylindrical-shaped electrode assembly 2. To be more specific, the protective plates 7 are disposed at a position where the divided non-covered stacked portion 271 is sandwiched between the protective plates 7 and the bonding portions 522. In this embodiment, the protective plates 7 have a rectangular shape elongated in the Z axis direction.

The insulating member 6 is disposed between the case 3 (to describe in more detail, case body 31) and the electrode assembly 2. The insulating member 6 is made of a resin having insulation property. In this embodiment, the insulating member 6 is formed by bending a sheet-like member which has an insulation property and is formed in a predetermined shape by cutting (see FIG. 2).

Next, a method of manufacturing the energy storage device 1 is described also with reference to FIG. 7 to FIG. 10.

First, the external terminals 4 and the current collectors 5 are assembled to the lid plate 32. Subsequently, the electrode assembly 2 is bonded to the current collectors 5 which are assembled to the lid plate 32. In the example of this embodiment, the non-covered stacked portions 27 of the electrode assembly 2 (to be more specific, divided non-covered stacked portion 271) and the bonding portions 522 of the current collectors 5 are bonded to each other by ultrasonic bonding. The detailed operation is described hereinafter.

Figure 7:
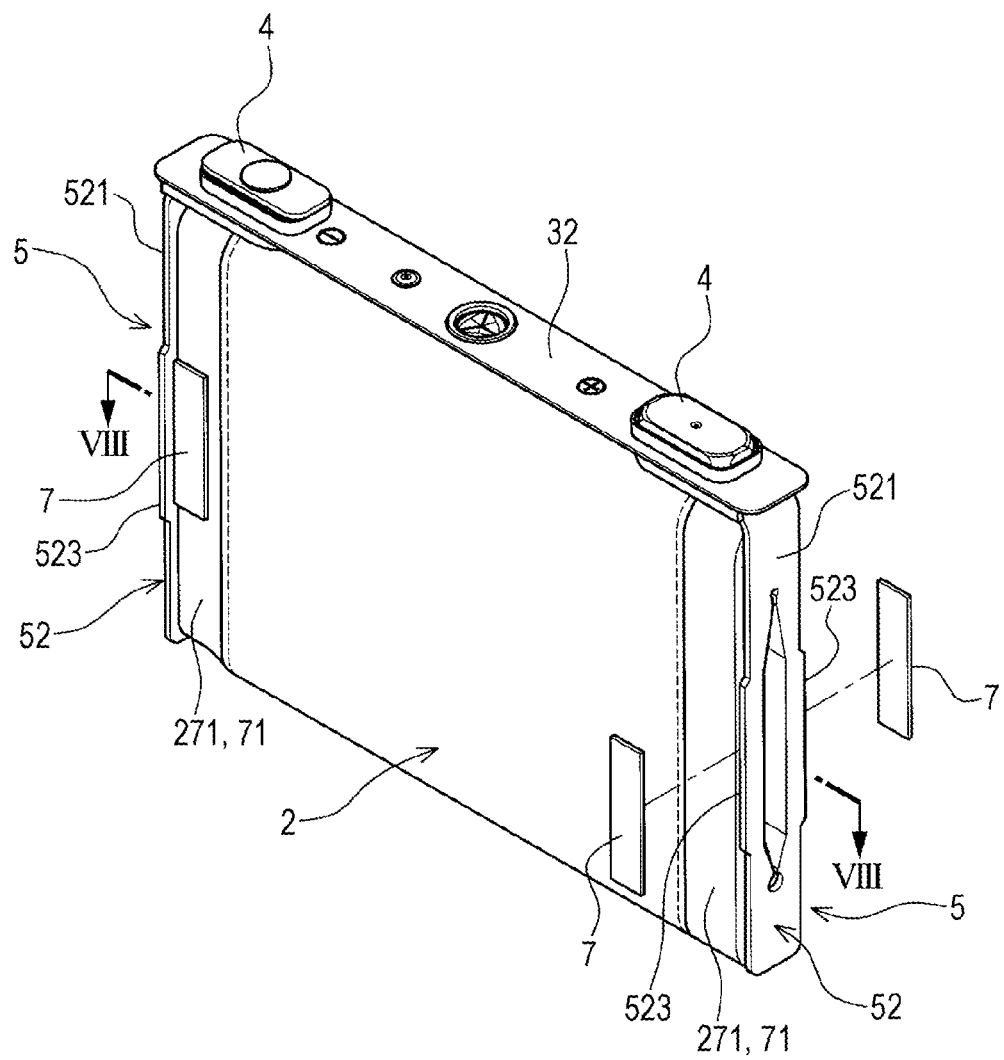
FIG. 7 is a view for describing a method of bonding the electrode assembly and the current collector to each other.
Figure 8:
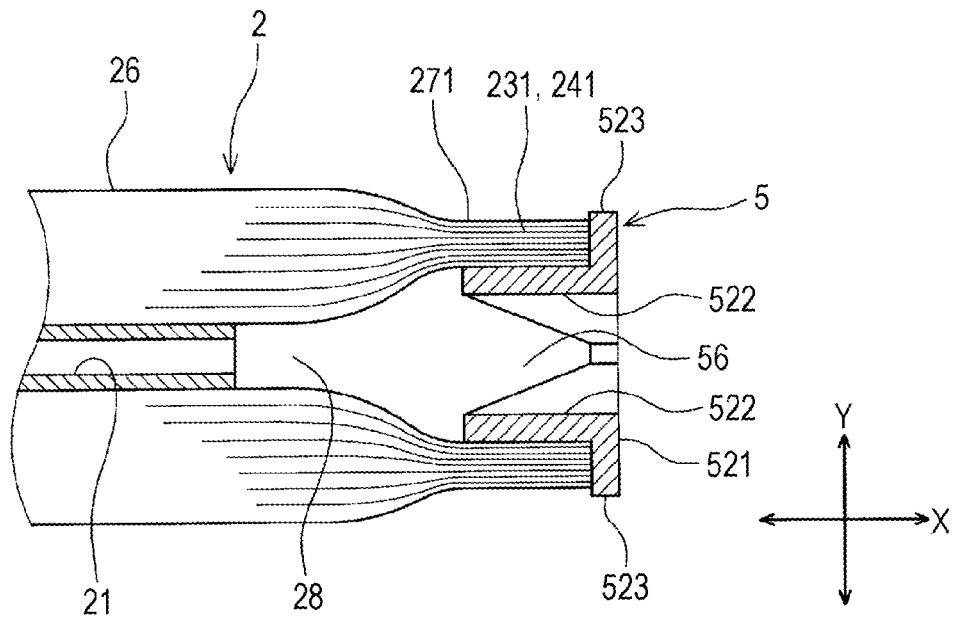
FIG. 8 is a cross-sectional schematic view taken along line VIII-VIII in FIG. 7 in a state before a protective plate is disposed on a non-covered stacked portion.

As shown in FIG. 7 and FIG. 8, the bonding portions 522 of the current collector 5 are disposed such that the bonding portions 522 are brought into face contact with the divided non-covered stacked portions 271 from one side (to be more specific, from an inner peripheral surface side of the flat-cylindrical-shaped electrode assembly 2) in the stacking direction of the non-covered portions 231, 241 which form the divided non-covered stacked portions 271 (in the Y axis direction in the example of this embodiment). In this state, the restricting portions 523 of the current collector 5 opposedly face the divided non-covered stacked portions 271 in a state that the restricting portions 523 are brought into contact with or are disposed close to the distal ends of the divided non-covered stacked portions 271 (respective edges of the plurality of stacked non-covered portions 231, 241).

Figure 9:
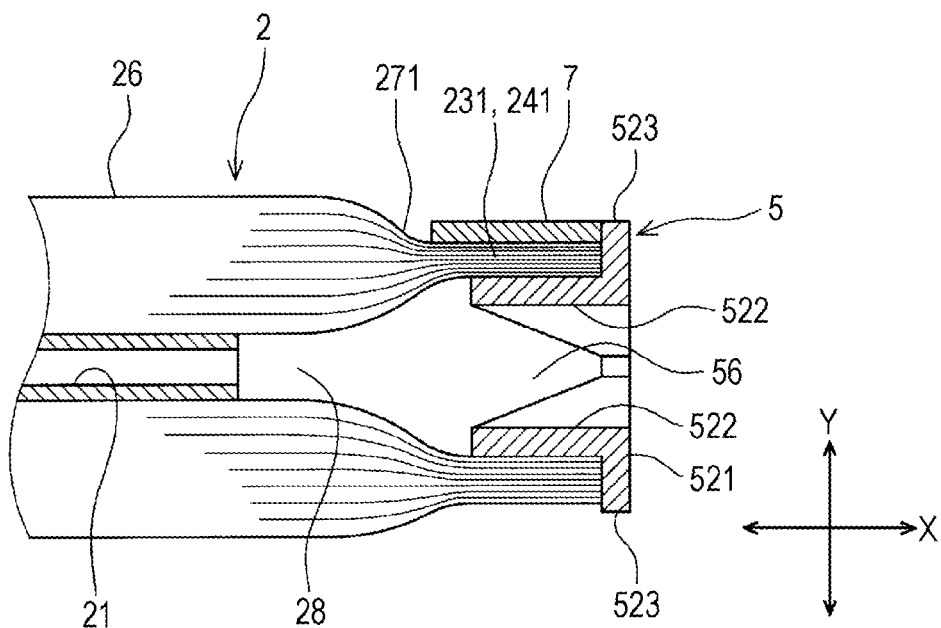
FIG. 9 is a cross-sectional schematic view taken along line VIII-VIII in FIG. 7 in a state where the protective plate is disposed on the non-covered stacked portion.

The protective plates 7 are disposed so as to be brought into face contact with the divided non-covered stacked portions 271 from the other side in the stacking direction (to be more specific, an outer peripheral surface side of the cylindrical electrode assembly 2) (see FIG. 9). At this stage of operation, the protective plates 7 are disposed at a position overlapping with the restricting portions 523 as viewed in the Y axis direction in a state where long sides of the rectangular-shaped protective plates 7 are brought into contact with or are disposed close to the restricting portions 523 extending in the Z axis direction and are also disposed parallel to the restricting portions 523. The restricting portions 523 project from the divided non-covered stacked portions 271 in the Y axis direction.

Figure 10:
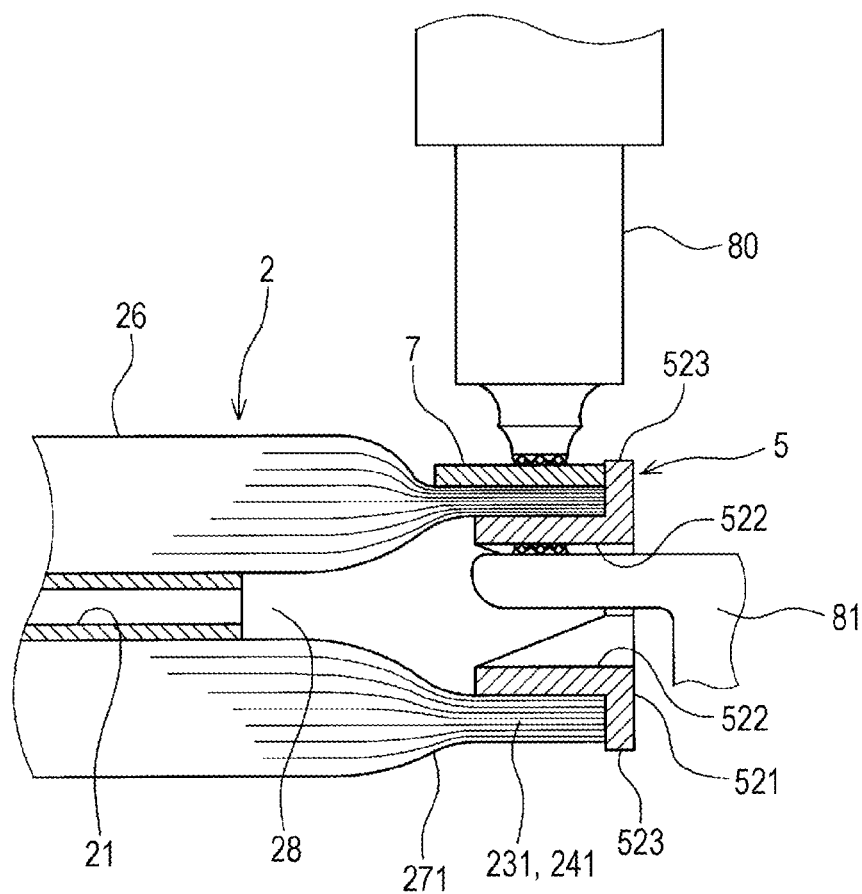
FIG. 10 is a schematic view for describing ultrasonic bonding between the electrode assembly and the current collector.

In this manner, by making the bonding portion 522, the divided non-covered stacked portion 271, and the protective plate 7 overlap with each other such that the divided non-covered stacked portion 271 is positioned between the bonding portion 522 and the protective plate 7, as shown in FIG. 10, the bonding portion 522, the divided non-covered stacked portion 271, and the protective plate 7 which are made to overlap with each other are sandwiched between a horn 80 and an anvil 81. By applying ultrasonic vibration to the horn 80 in a state where the horn 80 is pressed toward the anvil 81, these components are bonded to each other by ultrasonic bonding. In this operation, the horn 80 or the anvil 81 is not brought into direct contact with the non-covered stacked portion 27 (to describe in more detail, the non-covered portion 231, 241 of the electrode (positive electrode 23, negative electrode 24) which forms the non-covered stacked portion 27). That is, the protective plate 7 or the bonding portion 522 exists between the horn 80 or the anvil 81 and the non-covered stacked portion 27 and hence, it is possible to prevent breaking of the non-covered portions 231, 241 when ultrasonic vibration is applied to the non-covered portions 231, 241.

By repeatedly performing the above-mentioned ultrasonic bonding of the bonding portion 522, the divided non-covered stacked portion 271 and the protective plate 7 or by performing the above-mentioned ultrasonic bonding simultaneously at plural positions, two divided non-covered stacked portions 271 on the positive electrode side (two divided non-covered stacked portions disposed in parallel with the hollow portion 28 sandwiched therebetween on a positive electrode side) of the electrode assembly 2 and two bonding portions 522 of the current collector 5 of the positive electrode are boned to each other respectively, while two divided non-covered stacked portions 271 on the negative electrode side of the electrode assembly 2 and two bonding portions 522 of the current collector 5 of the negative electrode are bonded to each other respectively. With such an operation, the electrode assembly 2 is assembled to the lid plate 32.

When the electrode assembly 2, the current collectors 5, the external terminals 4 and the like are assembled to the lid plate 32, the electrode assembly 2 in a state where the electrode assembly 2 is assembled to the lid plate 32 is inserted into the case body 31 until the lid plate 32 is brought into contact with the opening peripheral edge portion 34 of the case body 31. At this stage of operation, the peripheral edge of the electrode assembly 2 is covered by the insulating member 6.

Subsequently, the boundary portion between the lid plate 32 and the opening peripheral edge portion 34 of the case body 31 is welded (by laser welding or the like) and, thereafter, an electrolyte solution is filled (poured) through an electrolyte solution filling port formed in the case 3, and the electrolyte solution filling port is sealed so that the energy storage device 1 is completed.

According to the above-mentioned method of manufacturing the energy storage device 1, even when the protective plate 7 intends to move toward a distal end side of the non-covered stacked portion 27 when the bonding portion 522, the non-covered stacked portion 27 (to describe in more detail, the divided non-covered stacked portion 271) and the protective plate 7 are made to overlap with each other, the protective plate 7 is brought into contact with the restricting portion 523 and hence, the further movement of the protective plate 7 toward the distal end side can be restricted.

To be more specific, when the ultrasonic bonding is performed, during a period from a point of time that the bonding portion 522, the divided non-covered stacked portion 271 and the protective plate 7 are made to overlap with each other to a point of time that the bonding portion 522, the divided non-covered stacked portion 271 and the protective plate 7 are sandwiched between the horn 80 and the anvil 81, the protective plate 7 is merely placed on a surface of the divided non-covered stacked portion 271 (outer peripheral surface of the electrode assembly 2). That is, the protective plate 7 is not fixed to the divided non-covered stacked portion 271 and hence, the protective plate 7 is liable to be displaced with respect to the divided non-covered stacked portion 271. However, the movement of the protective plate 7 beyond the distal end of the divided non-covered stacked portion 271 is restricted by the restricting portion 523 and hence, according to the manufacturing method of this embodiment, the displacement of the protective plate 7 toward the outside (the distal end side of the non-covered stacked portion 27) from the electrode assembly 2 and the current collector 5 at the time of bonding (at the time of ultrasonic bonding in the example of this embodiment) can be suppressed.

In the energy storage device 1 which is manufactured by the manufacturing method of this embodiment, in the enlarged width portion (the restricting portion 523, and a portion of the body 521 outside the bonding portion 522 in the Y axis direction at a position where the restricting portion 523 is disposed) of the current collector 5, a distal end of the enlarged width portion (that is, a distal end of the restricting portion 523) projects from the protective plate 7. Accordingly, a cross-sectional area of the current collector 5 is increased at the enlarged width portion and hence, a resistance at the current collector 5 can be suppressed (reduced).

It is needless to say that the method of manufacturing an energy storage device according to the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

The specific configuration of the restricting portion 523 of the current collector 5 is not limited. For example, in the above-mentioned embodiment, the restricting portion 523 extends continuously in the Z axis direction. However, the restricting portion 523 may extend discontinuously. In the above-mentioned embodiment, a size of the restricting portion 523 in the Z axis direction is set equal to or larger than a size of the protective plate 7 in the Z axis direction. However, the present invention is not limited to such a configuration. The size of the restricting portion 523 in the Z axis direction may be set smaller than the size of the protective plate 7 in the Z axis direction. In the above-mentioned embodiment, the restricting portion 523 extends from the body 521. However, the present invention is not limited to such a configuration. The restricting portion 523 may extend from other portions such as the bonding portion 522 of the current collector 5 except for the body 521. In the above-mentioned embodiment, an end (distal end) of the restricting portion 523 in the Y axis direction does not project from the protective plate 7 in a state before the electrode assembly 2 and the current collector 5 are bonded to each other. However, the present invention is not limited to such a configuration. It is sufficient that the restricting portion 523 projects more toward a protective plate 7 side than the non-covered stacked portion 27 (divided non-covered stacked portion 271), and a specific size of the restricting portion 523 in the Y axis direction is not limited. That is, it is sufficient that, when the protective plate 7 disposed on the non-covered stacked portion 27 (protective plate 7 before being bonded) intends to move so as to project toward a distal end side of the non-covered stacked portion 27, the restricting portion 523 projects from the non-covered stacked portion 27 in the Y axis direction to a position where the protective plate 7 is brought into contact with the restricting portion so that the movement of the protective plate 7 is restricted.

The specific configuration of the protective plate 7 is also not limited. For example, in the above-mentioned embodiment, the protective plate 7 is formed of a rectangular plate member. However, the present invention is not limited to such a configuration. The protective plate 7 may have other shapes. That is, it is sufficient for the protective plate 7 to be positioned between the horn 80 or the anvil 81 and the non-covered stacked portion 27 (to describe in more detail, the non-covered portion 231, 241 of the electrode 23, 24) and to have a shape by which it is possible to prevent the non-covered stacked portion 27 from being brought into contact with the horn 80 or the anvil 81.

In the method of manufacturing the energy storage device 1 according to the above-mentioned embodiment, when the electrode assembly 2 and the current collector 5 are bonded to each other, the bonding portion 522 of the current collector 5 is disposed on an inner peripheral surface side of the electrode assembly 2, and the protective plate 7 is disposed on the outer peripheral surface side of the electrode assembly 2. However, the present invention is not limited to such a configuration. The protective plate 7 may be disposed on the inner peripheral surface side of the electrode assembly 2, and the bonding portion 522 of the current collector 5 may be disposed on the outer peripheral surface side of the electrode assembly 2.

In the method of manufacturing the energy storage device 1 of the above-mentioned embodiment, the bonding of the electrode assembly 2 and the current collector 5 is performed by ultrasonic bonding. However, the present invention is not limited to such a configuration. The bonding may be performed by resistant welding, laser welding or the like.

In the above-mentioned embodiment, the electrode assembly 2 of the energy storage device 1 is an electrode assembly of a so-called winding type where the elongated electrodes 23, 24 are wound together. However, the present invention is not limited to such a configuration. The electrode assembly 2 may be an electrode assembly of a so-called stacking type where sheet-like electrodes 23, 24 are stacked on each other, or may be an electrode assembly of a type where at least one of a positive electrode 23 and a negative electrode 24 is elongated and is folded in a zigzag manner (folded in a bellows shape).

Figure 11:
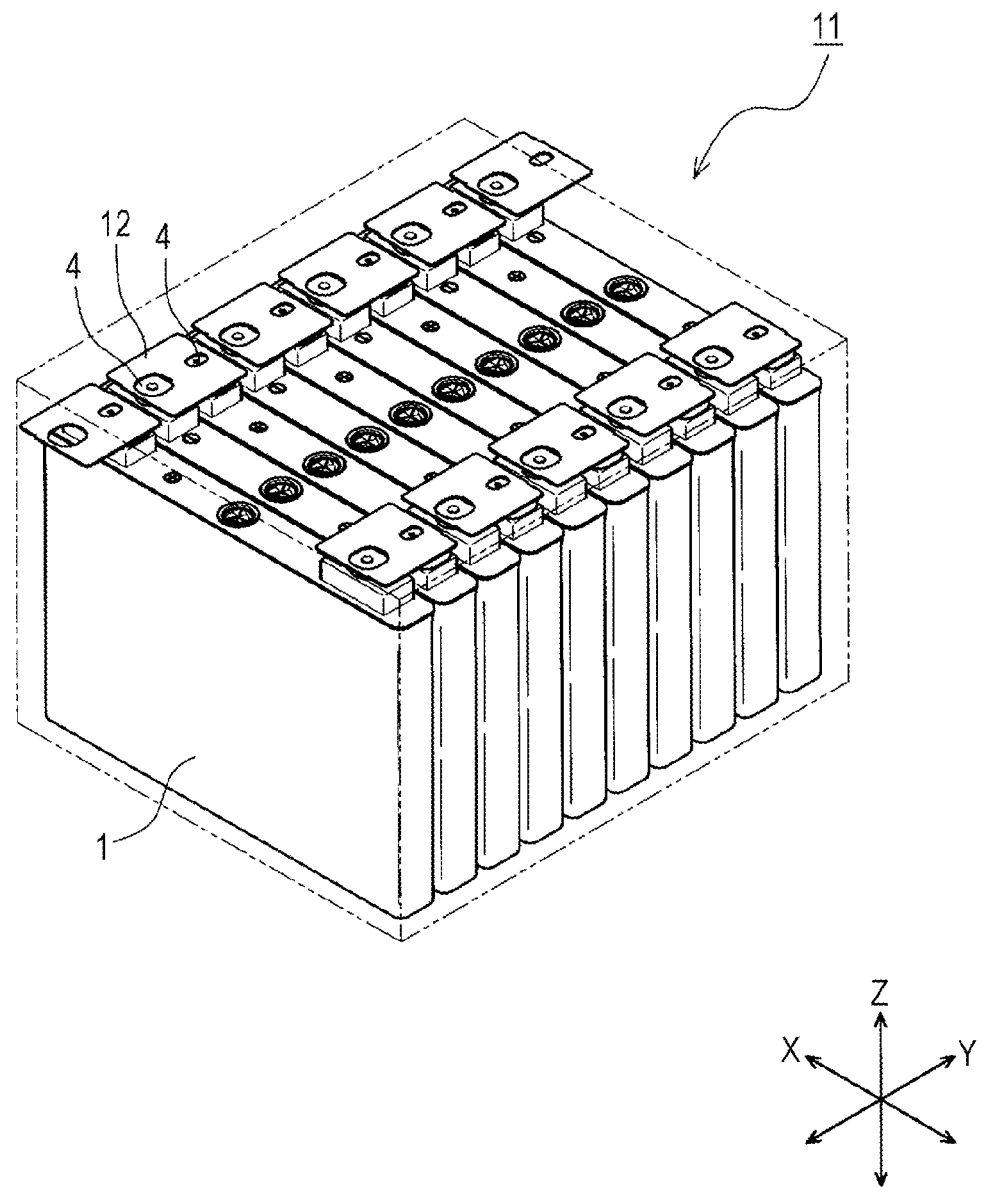
FIG. 11 is a perspective view of an energy storage apparatus which includes the energy storage devices.
Figure 12:
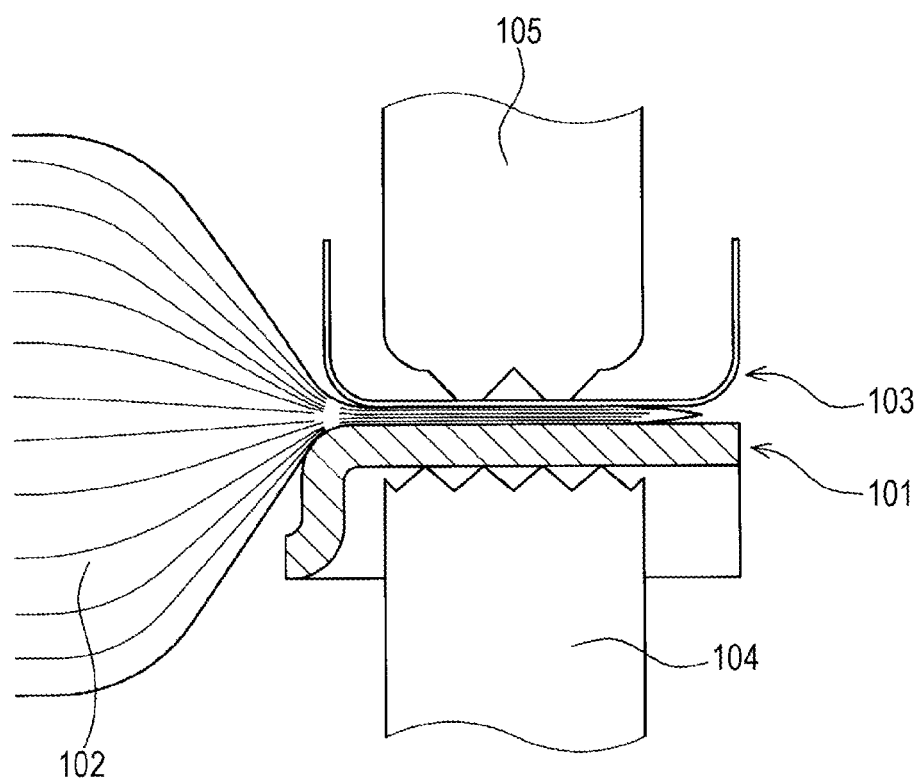
FIG. 12 is a schematic view for describing a conventional method of bonding a group of electrodes and a current collector connecting plate to each other.

In the above-mentioned embodiment, the description has been made with respect to the case where the energy storage device is used as a chargeable and dischargeable nonaqueous electrolyte secondary battery (for example, lithium ion secondary battery). However, a kind and a size (capacity) of the energy storage device can be arbitrarily set. In the above-mentioned embodiment, the lithium ion secondary battery is described as one example of the energy storage device. However, the present invention is not limited to the lithium ion secondary battery. The present invention is also applicable to various kinds of secondary batteries, a primary battery, and an energy storage device of a capacitor such as an electric double layered capacitor, for example, The energy storage device 1 (for example, a battery) may be used for an energy storage apparatus 11 shown in FIG. 11 (a battery module in a case where the energy storage device is a battery). The energy storage apparatus 11 includes at least two energy storage devices 1, and a bus bar member 12 which electrically connects two (different) energy storage devices 1 to each other. In this case, it is sufficient that the technical features of the present invention be applied to at least one energy storage device 1.

What is claimed is:
1. An energy storage device, comprising:
   an electrode assembly including a non-covered stacked portion, wherein electrodes, each including a covered portion which is covered by an active material layer and a non-covered portion which extends from the covered portion in a first direction and is not covered by the active material layer, are stacked on each other such that the covered portions overlap with each other and the non-covered portions overlap with each other, and the non-covered stacked portion is formed by stacking the non-covered portions;
   a protective plate which is brought into face contact with the non-covered stacked portion from one side in a stacking direction orthogonal to the first direction of the non-covered stacked portion;

a current collector including a bonding portion which is brought into face contact with the non-covered stacked portion from an other side in the stacking direction, and an enlarged width portion extending in the stacking direction from the bonding portion in a region disposed adjacently to a distal end of the non-covered stacked portion in the first direction; and a case housing the electrode assembly, the protective plate, and the current collector, wherein the enlarged width portion is configured to restrict a movement of the protective plate in the first direction, and wherein the bonding portion abuts an inner surface of the non-covered stacked portion, and the protective plate abuts an outer surface of the non-covered stacked portion.

2. The energy storage device according to claim 1, wherein the current collector is directly fixed to the case.

3. The energy storage device according to claim 1, wherein the case includes a case body having an inner surface which opposedly faces the protective plate, and wherein the inner surface of the case body, the protective plate, and the non-covered stacked portion are disposed in this order in the stacking direction.

4. A method of manufacturing an energy storage device, the method comprising:

providing an electrode assembly, wherein electrodes, each including a covered portion which is covered by an active material layer and a non-covered portion which extends from the covered portion in a first direction and is not covered by the active material layer, are stacked on each other such that the covered portions overlap with each other and the non-covered portions overlap with each other;

bringing a bonding portion of a current collector into face contact with a non-covered stacked portion formed by stacking the non-covered portions from one side in a stacking direction orthogonal to the first direction of the non-covered portion, and bringing a protective plate into face contact with the non-covered stacked portion from an other side in the stacking direction; and bonding the bonding portion, the non-covered stacked portion, and the protective plate to each other in a state where the non-covered stacked portion is sandwiched between the bonding portions and the protective plate, wherein the current collector includes an enlarged width portion which projects from the non-covered stacked portion from the one side toward the other side of the non-covered stacked portion in a region disposed adjacently to a distal end of the non-covered stacked portion in the first direction, and wherein the bonding portion abuts an inner surface of the non-covered stacked portion, and the protective plate abuts an outer surface of the non-covered stacked portion.

5. The energy storage device according to claim 1, wherein, in a view from the first direction, the enlarged width portion overlaps the protective plate.

6. The energy storage device according to claim 1, wherein, in the stacking direction, the protective plate, the non-covered stacked portion, and the bonding portion are sequentially stacked.

7. The energy storage device according to claim 1, wherein the protective plate is spaced apart from the bonding portion.

8. The energy storage device according to claim 1, wherein the non-covered stacked portion spaces apart the protective plate from the bonding portion.

9. The energy storage device according to claim 1, wherein the enlarged width portion extends in the stacking direction from at least an area of the bonding portion that is located in a middle of the bonding portion in a second direction orthogonal to the first direction and the stacking direction.

10. The method according to claim 4, wherein, in a view from the first direction, the enlarged width portion overlaps the protective plate.

11. The method according to claim 4, wherein the protective plate is spaced apart from the bonding portion.

12. The method according to claim 4, wherein the non-covered stacked portion spaces apart the protective plate from the bonding portion.

13. The method according to claim 4, wherein the enlarged width portion extends in the stacking direction from at least an area of the bonding portion that is located in a middle of the bonding portion in a second direction orthogonal to the first direction and the stacking direction.

14. The method according to claim 4, wherein, in the stacking direction, the protective plate, the non-covered stacked portion, and the bonding portion are sequentially stacked.

15. An energy storage device, comprising:

an electrode assembly including a non-covered stacked portion, wherein electrodes, each including a covered portion which is covered by an active material layer and a non-covered portion which extends from the covered portion in a first direction and is not covered by the active material layer, are stacked on each other, the non-covered stacked portion including the non-covered portions stacked on each other;

a protective plate which is disposed on an outer surface of the non-covered stacked portion in a stacking direction orthogonal to the first direction;

a current collector including:

a bonding portion which is disposed on an inner surface of the non-covered stacked portion; and an enlarged width portion extending in the stacking direction from the bonding portion; and a case housing the electrode assembly, the protective plate, and the current collector.

16. The energy storage device according to claim 15, wherein the enlarged width portion is configured to restrict a movement of the protective plate in the first direction.

17. The energy storage device according to claim 15, wherein, in a view from the first direction, the enlarged width portion overlaps the protective plate.

18. The energy storage device according to claim 15, wherein the bonding portion abuts the inner surface of the non-covered stacked portion, and the protective plate abuts the outer surface of the non-covered stacked portion, such that, in the stacking direction, the protective plate, the non-covered stacked portion, and the bonding portion are sequentially stacked.

* * * * *